UNITED STATES PATENT OFFICE.

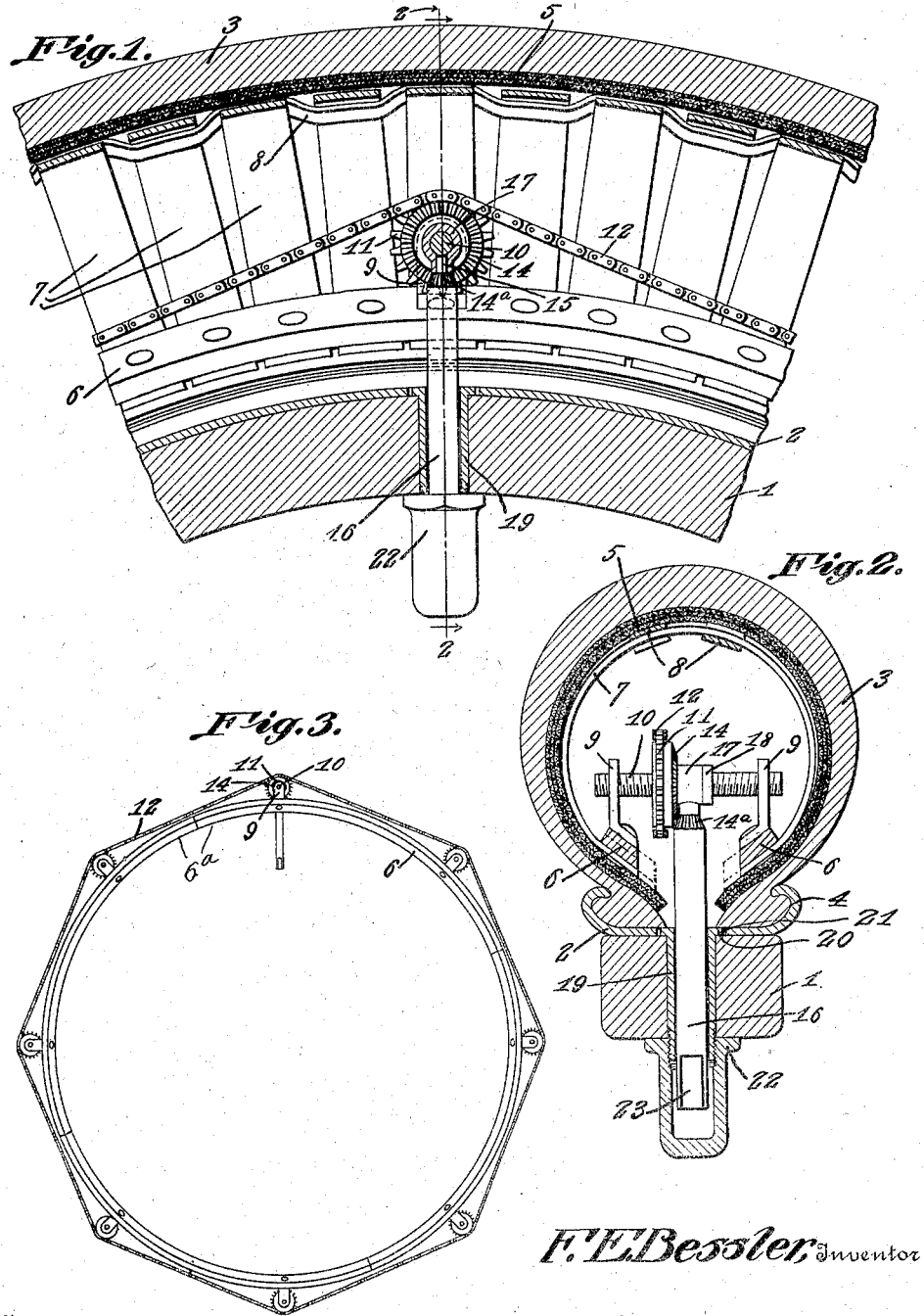

FRANK E. BESSLER, OF AKRON, OHIO.

INNER TUBE.

1,307,770. Specification of Letters Patent. Patented June 24, 1919.

Application filed September 17, 1918. Serial No. 254,487.

*To all whom it may concern:*

Be it known that I, FRANK E. BESSLER, a citizen of the United States, residing at Akron, in the county of Summit and State of Ohio, have invented a new and useful Inner Tube, of which the following is a specification.

The device forming the subject matter of this application is a vehicle tire and the invention aims to provide novel means for expanding and contracting transversely, an inner tube located within the casing of the tire.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in longitudinal section, a portion of a tire constructed in accordance with the invention, parts being shown in elevation; Fig. 2 is a cross section taken on the line 2—2 of Fig. 1; and Fig. 3 is a diagrammatic elevation showing the means for mounting the sprocket chain which, in combination with other parts, serves to expand and contract the inner tube transversely.

The numeral 1 marks a felly carrying a rim 2 with which a casing 3 is assembled in any desired way as shown at 4. Located within the casing 3 is a liner 5 which may be made of canvas, rubber, leather or any other flexible material, the inner edges of the liner being disposed adjacent to the inner edges of the casing 3. The numeral 6 denotes a pair of circumferential members located adjacent to the inner edges of the liner 5, the members 6 being connected by transverse curved resilient ribs 7 and comprising sections 6$^a$. Resilient strips 8, preferably made of metal are located side by side. Each of these strips 8 passes across the inner surface of one rib 7 and across the outer surface of the next rib, one strip passing across the inner surface of each rib, and the other strip passing across the outer surface of the same rib, as clearly indicated in Fig. 2.

Bearings 9 are mounted on the members 6 in oppositely disposed relation. The ends of screws 10 are oppositely threaded into the bearings 9. Sprocket wheels 11 are secured to the screws 10 between the bearings 9. A circumferential sprocket chain 12 is engaged with the sprocket wheels 11. One of the sprocket wheels 11 is provided on its side with a beveled gear 14, meshing into a beveled pinion 14$^a$ constituting a part of a shaft 16 having a reduced end 15 journaled in a bearing 17 on the said screw 10. A collar 18 is mounted on the said screw 10 and coöperates with the beveled gear 14 to hold the bearing 17 in place. The said screw 10 is not threaded into the bearing 17, but rotates freely therein. The shaft 16 is journaled in a tube 19 mounted in the felly 1, the tube has a flange 20 which engages the outer curve of the felly and is received in an opening 21 in the rim 2. A cap 22 is threaded on the outer end of the tube 19 and engages the inner curve of the felly 1. The felly 1, therefore, is clamped between the cap 22 and the flange 20. The shaft 16 is supplied with a squared end 23 located in the cap 22 and adapted to receive a key.

In practical operation, when the shaft 16 is rotated, the beveled pinion 14$^a$ meshing into the beveled gear 14, will effect a rotation of one of the screws 10. From this screw, motion will be transmitted to all of the other screws 10, by way of the sprocket chain 12 and the sprocket wheels 11. When the screws 10 are rotated, the members 6 will move toward or away from each other, because the ends of the screws are oppositely threaded into the bearings 9. In this way, the expansible inner tube, comprising the members 6 and the ribs 7, may be expanded or contracted. The liner 5 serves to prevent the casing 6 from being worn or injured by the ribs 7.

Having thus described the invention, what is claimed is:—

1. In a device of the class described, an inner tube; screws oppositely threaded into opposed portions of the tube; means for actuating one screw; and means for transmitting motion from screw to screw.

2. In a device of the class described, an inner tube; screws oppositely threaded at their ends into opposed portions of the tube; sprocket wheels on the screws; a sprocket chain trained about the sprocket wheels; and means for operating one screw.

3. In a device of the class described, an inner tube; screws oppositely threaded at their ends into opposed portions of the tube; sprocket wheels on the screws; a sprocket chain trained about the sprocket wheels; a beveled gear on one screw; a beveled pinion meshing into the beveled gear; a shaft whereon the beveled pinion is mounted; and means for supporting the shaft for rotation.

In testimony that I claim the foregoing as my own, I have hereto affixed my signature in the presence of two witnesses.

FRANK E. BESSLER.

Witnesses:
DOROTHY C. SABIN,
AMOS H. ENGLEBERT.

Copies of this patent may be obtained for five cents each, by addressing the "Commissioner of Patents, Washington, D. C."